United States Patent
Klatt

(10) Patent No.: US 9,037,137 B2
(45) Date of Patent: May 19, 2015

(54) METHOD AND PROGRAM FOR CELL BARRING IN A CELLULAR NETWORK

(75) Inventor: Axel Klatt, Cologne (DE)

(73) Assignee: DEUTSCHE TELEKOM AG, Bonn (DE)

(*) Notice: Subject to any disclaimer, the term of this patent is extended or adjusted under 35 U.S.C. 154(b) by 41 days.

(21) Appl. No.: 13/812,145

(22) PCT Filed: Jul. 29, 2011

(86) PCT No.: PCT/EP2011/003806
§ 371 (c)(1),
(2), (4) Date: Jan. 25, 2013

(87) PCT Pub. No.: WO2012/013355
PCT Pub. Date: Feb. 2, 2012

(65) Prior Publication Data
US 2013/0122906 A1  May 16, 2013

Related U.S. Application Data

(60) Provisional application No. 61/369,177, filed on Jul. 30, 2010.

(30) Foreign Application Priority Data

Jul. 30, 2010 (EP) .................................... 10007963

(51) Int. Cl.
*H04W 4/00* (2009.01)
*H04W 48/06* (2009.01)
*H04W 48/02* (2009.01)

(52) U.S. Cl.
CPC .............. *H04W 48/06* (2013.01); *H04W 48/02* (2013.01)

(58) Field of Classification Search
CPC ...... H04W 48/02; H04W 48/06; H04L 47/10; H04L 43/08

USPC ...................... 455/435.1, 450, 453, 418–420; 370/329, 235
See application file for complete search history.

(56) References Cited

U.S. PATENT DOCUMENTS 7,933,205 B1 * 4/2011 Shaw et al. .................... 370/235
(Continued)

FOREIGN PATENT DOCUMENTS

EP           2119273 A1    11/2009
EP           2205026 A1     7/2010

OTHER PUBLICATIONS

Overload Control for Machine Type Communication, 3rd Generation Partnership Project (3GPP); Technicalspecification Group (TSG) Radio Access Network (RAN); Workinggroup 2 (WG2)#71, Aug. 16, 2010, Nr:R2-104501, pp. 1-2.
Text proposal for TR 37,868 on Access Barring Scaling for MTC, 3rd Generation Partnership Project (3GPP); Technicalspecification Group (TSG) Radio Access Network (RAN); Working Group 2 (WG2)#71, Aug. 23, 2010, Nr:R2-105215, pp. 1-3.
(Continued)

*Primary Examiner* — Kashif Siddiqui
*Assistant Examiner* — Mong-Thuy Tran
(74) *Attorney, Agent, or Firm* — Leydig, Voit & Mayer, Ltd.

(57) ABSTRACT

A method for controlling the access of a User Equipment (UE) to a public land mobile network (PLMN), the PLMN providing at least a service, the PLMN having at least one network cell, a control channel being broadcast within the network cell, includes: transmitting a barring factor information to the UE on the broadcast control channel within the network cell; transmitting a barring scaling information to the UE on a control channel independently of the barring factor information; and realizing, based on a combination of the barring factor information and the barring scaling information, an access control to the service with regard to the UE by deciding whether a specific access request of the UE to the service is accepted or rejected.

20 Claims, 4 Drawing Sheets

(56) References Cited

U.S. PATENT DOCUMENTS

| | | | |
|---|---|---|---|
| 8,412,211 B2* | 4/2013 | Petrovic et al. | 455/450 |
| 2002/0114294 A1* | 8/2002 | Toskala et al. | 370/329 |
| 2008/0311892 A1* | 12/2008 | Lee et al. | 455/414.1 |
| 2010/0124926 A1 | 5/2010 | Klatt et al. | |
| 2010/0304747 A1* | 12/2010 | Kazmi et al. | 455/436 |
| 2010/0322174 A1* | 12/2010 | Ji et al. | 370/329 |
| 2012/0147830 A1* | 6/2012 | Lohr et al. | 370/329 |

OTHER PUBLICATIONS

LTE, Evolved Universal Terrestrial Radio Access (E-UTRA); Radio Resource Control (RRC); Protocol specification (3GPP TS 36.331 version 9.2.0 Release 9), Technical Specification, Apr. 1, 2010 European Telecommunications Standards Institute (ETSI), 650, route des Lucioles ; F-06921 Sophia-Antipolis ; France, vol. 3GPP RAN 2, Nr:V9.2.0, pp. 1-4.

European Patent Office, International Search Report in International Patent Application No. PCT/EP2011/003806 (Nov. 11, 2011).

* cited by examiner

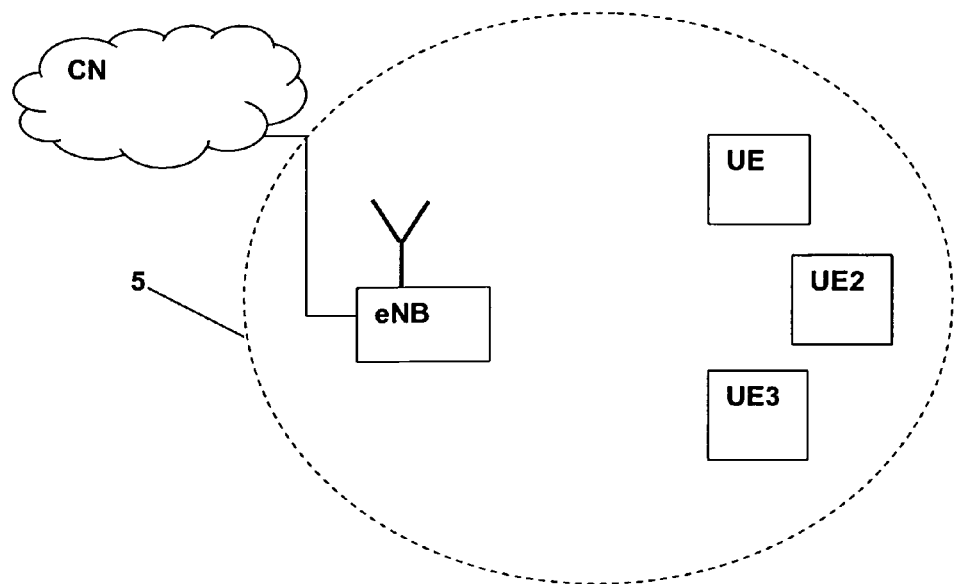
Fig. 4
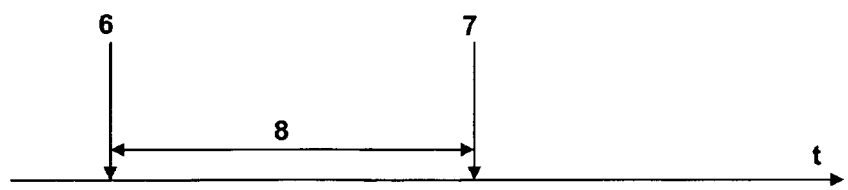
Fig. 5
UE:    ABSF := {0.1; 0.5; 1; 1; 2; 5; 10; 10}
UE 2:  ABSF := {0.1; 0.1; 0.5; 0.5; 1; 5; 5; 5}
UE 3:  ABSF := {0.2; 0.2; 0.5; 1; 1; 1; 5; 10}
       BT := {0.1s; 1s; 1s; 2s; 5s; 10s; 60s; 180s}
Fig. 6

METHOD AND PROGRAM FOR CELL BARRING IN A CELLULAR NETWORK

CROSS-REFERENCE TO RELATED-APPLICATIONS

This application is a U.S. National Phase application under 35 U.S.C. §371 of International Application No. PCT/EP2011/003806, filed on Jul. 29, 2011, and claims benefit to U.S. Provisional Application No. 61/369,177, filed on Jul. 30, 2010, and to European Patent Application No. EP 10007963.1, filed on Jul. 30, 2010. The International application was published in English on Feb. 2, 2012 as WO 2012/013355 A1 under PCT Article 21(2).

FIELD

The present invention relates to a method and a program for selective access control to shared resources in a cellular mobile network. It enables the protection of the network in case of overload situations and is applicable to any cellular mobile network like: GERAN, UTRAN, LTE/E-UTRAN, LTE-Advanced, cdma2000, WiMAX, WiBro etc, wherein on a per connection, or preferably on a per application or subscription basis, the access towards a shared medium can be controlled by the operator in order to handle high load or overload situations, while maintaining service operation in general.

BACKGROUND

In cellular mobile systems like GSM (but also its successors) the access by a mobile to the network is normally performed via a shared resource medium, called Random Access Channel (RACH). In case the UE initiates a voice call, it first contacts the mobile network via the RACH and typically gets subsequently a Traffic Channel allocated to be used for carrying the voice call. In UMTS the initial phase is similar and the terminal, or user equipment (UE), gets a so-called Dedicated Channel (DCH) assigned to carry the voice call.

In order to prevent UEs from accessing an overloaded cell the concept of Access Classes was invented when GSM was specified [3GPP TS 22.011]. This concept was also applied for UMTS. For this concept each SIM card is assigned to a so-called "Access Class" which is configured by the operator into the SIM card initially. 10 Access Classes are defined for ordinary users [3GPP TS 22.011] and are normally equally distributed to the population of SIM cards. Besides these Access Classes (AC) ranging from 0 to 9, a specific AC 10 is defined for Emergency Calls and 5 specific ACs for operator and other purposes. AC 10 is not assigned to a SIM card, but used by a terminal when placing an emergency call. AC 11 to 15 are assigned additionally to 1 Access Class out of 0 to 9 based on operators policies. Details can be found in [3GPP TS 22.011].

In order to prevent access to a cellular basestation in certain situations (i.e. overload situations) it is possible to bar access to the network by blocking RACH access attempts using Access Class Barring—for UMTS system this principle is described in [3GPP TS 25.331]. A bitmap of 16 bit ranging from 0 to 15 is indicated on the Broadcast Control Channel of the UMTS cell. In case a specific portion (out of 0 to 9) or defined ACs 10 to 15 should be disallowed for access, the appropriate bit is set to "access barred".

Based on the equal distribution of AC between 0 and 9 it is possible to randomly block access to the cell in 10% steps (10% per individual AC between 0 and 9). As the assignment of ACs to SIM cards is randomly and also the distribution of terminals in given cell is randomly, it is currently with prior art only possible to block a certain percentage of access attempts randomly, without considering the subscription profile or the application requirements. As this was not a problem in former days where mobile networks were mainly used for placing voice calls, it is now required to enable a finer control over the access barring in case of load situation, due to the wide variety of different services and subscriptions in cellular networks.

When Enhanced-UTRAN (also known as "LTE") was being defined, the concept of access class barring was changed from a discrete assignment of Access Classes to SIM cards and a new concept for determining if access to a cell is applicable has been introduced. Details are defined, e.g., in [3GPP TS.36.331v9.2.0], paragraph 6.3.1, in relation to SystemInformationBlock Type 2. By doing this, the explicit relationship between AC barring and Access Class assignment to a particular UE is removed. Instead of equally distributed AC between 0.9, an Access Barring Factor (ABF) concept has been defined, where the Access Probability can be defined in finer than 10% steps and the barring only applies in case the UE will really initiate an access toward the network.

As can be seen in the current state of the art above, Access Barring Info is provided in E-UTRAN System Information Block Type 2 with the Information Element (IE) ac-BarringInfo. The struct consists of ac-BarringForEmergency, ac-BarringForMO-Signalling and ac-BarringForMO-Data. The first relates to AC 10 barring for Emergency Calls and can be set to "allowed" or "not allowed" (Boolean). The second applies specifically for establishment of signalling connections and was first introduced with the standardisation of E-UTRAN due to the fact that Access Barring for Mobile Originated Data might be applicable with a high likelihood and thus without separation also access for signalling connection would be prevented, resulting in the fact that a UE would also not be reachable in certain situations. The latter applies for Mobile Originated Data in E-UTRAN—which means any user data transmission originating from the terminal as E-UTRAN only support a Packet Service Domain. Hence it also applies for voice services using a Voice over IP (VoIP) data bearer.

As can be seen from the state of art, besides a separation between Emergency Calls, MO-Signalling and MO-Data, no further distinction for Access Class barring is applicable.

With the advent of smartphones—thus a wide range of applications with totally different traffic characteristics—as well as with the new field of machine-to-machine (M2M) communication, characteristics of access attempts to a cellular network have been completely changed. In contrast to former GSM systems, where placing voice calls by a human being was the main use case of mobile usage, now applications start to access and leave the cellular system much more frequently and thus new means of controlling the access to shared cellular resources—like, e.g., the Random Access Channel—of a cellular system are required. Especially two situations need to be considered by a solution to improve the state of the art:

First, the access to a shared medium does not require human interaction anymore—i.e. if placing a voice call would have failed a couple of times, the user simply would give up, while applications simply continue to try to access if no further preventing means are implemented.

Second, with the growing number of M2M devices, a huge amount of terminal devices in a given cell might request access to the shared resources simultaneously (e.g. to report a status every full hour or when a huge amount of M2M devices moves through the network and performs a location area update).

SUMMARY

In an embodiment, the present invention provides a method for controlling the access of a User Equipment (UE) to a public land mobile network (PLMN). The PLMN provides at least a service. The PLMN includes at least one network cell. A control channel is broadcast within the network cell. The method includes: transmitting a barring factor information to the UE on the broadcast control channel within the network cell; transmitting a barring scaling information to the UE on a control channel independently of the barring factor information; and realizing, based on a combination of the barring factor information and the barring scaling information, an access control to the service with regard to the UE by deciding whether a specific access request of the UE to the service is accepted or rejected.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 illustrates schematically a network cell of a public land mobile network (PLMN) using the inventive method.

FIG. 5 illustrates schematically the effect of the access barring time.

FIG. 6 illustrates schematically a plurality of examples of access barring scaling information and/or access barring time information.

DETAILED DESCRIPTION

Figure 1:
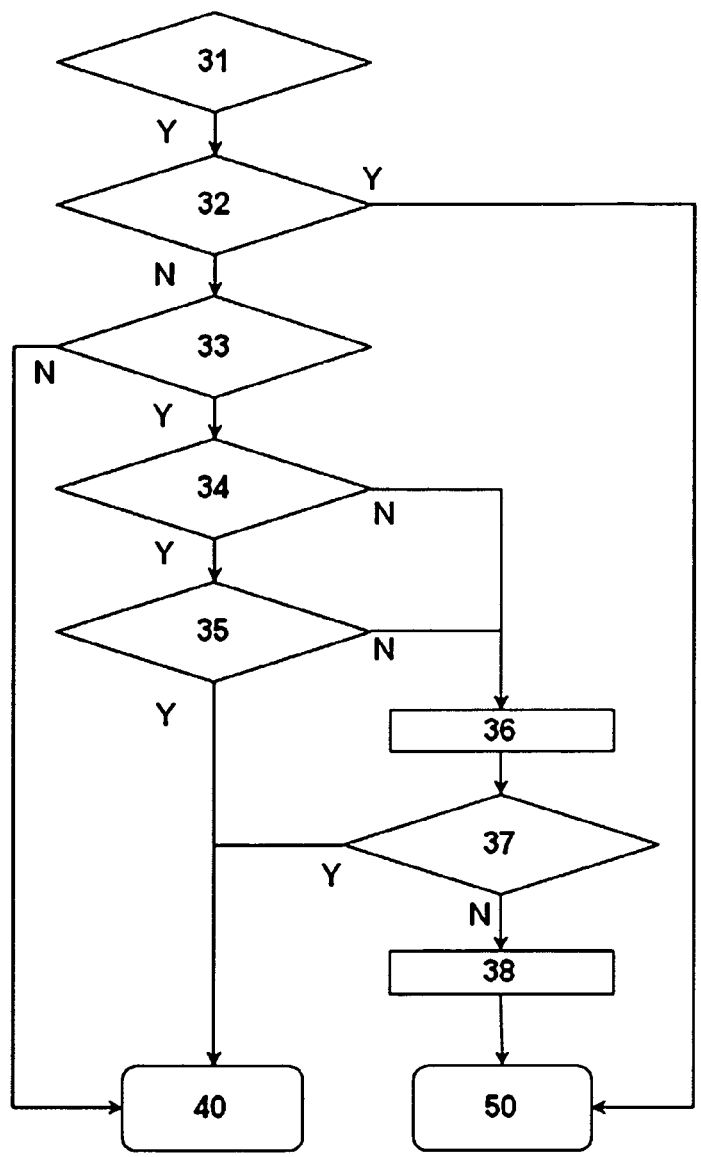
FIG. 1 illustrates schematically a flow diagram for access barring according to the prior art.

Embodiments of the present invention provide a method, a public land mobile network (PLMN), and a program for selective access control to shared resources in a cellular mobile network. The method according to the present invention especially takes into account different traffic or application/user characteristics and overcomes the limited control of the access class barring scheme used in cellular networks like for example GERAN, UMTS or E-UTRAN/LTE today.

In an embodiment, the present invention provides a method for controlling the access of a User Equipment to a public land mobile network (PLMN), wherein the public land mobile network (PLMN) provides at least a service, the public land mobile network (PLMN) comprising at least one network cell, wherein a control channel is broadcast within the network cell, the method comprising the steps of:

transmitting a barring factor information to the User Equipment on the broadcast control channel (BCCH) within the network cell, independently thereof transmitting a barring scaling information to the User Equipment on a control channel, especially a dedicated control channel, wherein by means of a combined use of the barring factor information and of the barring scaling information, an access control to the service is realized with regard to the User Equipment by deciding whether a specific access request of the User Equipment to the service is accepted or rejected.

According to the present invention, a terminal specific scaling on the access barring factors (derived from the broadcast control channel of the cell) is applied. Thereby, it is advantageously possible to increase or decrease the individual probability to gain access to a shared medium in a cellular network.

According to the present invention, it is preferred that the access barring (or permitting, i.e. the access control) functionality can be applied for a User Equipment being in a connected mode and also for a User Equipment being in an idle mode.

Thereby, it is advantageously possible to apply the inventive method to a plurality of possible situations of User Equipment within a network cell.

According to a preferred embodiment of the present invention, the barring scaling information is assigned specifically to the User Equipment.

This means that it is not only possible that two different User Equipments connected to a specific network cell of the public land mobile network (PLMN) can be treated differently with respect to performing the access control, but it is possible to individually scale the access permission rate (or access barring rate) of a specific User Equipment within the network cell, i.e. it is possible to realize an access control on a "per User Equipment" basis.

According to the present invention, it is thereby advantageously possible that in addition to the general access barring factor (valid for all UEs in a cell) a UE individual access barring is applied by individually scaling the general access barring factor.

The method is described by the following steps: access of a terminal to a shared medium in a cellular network by steps of:

determining if access restrictions to a shared medium apply (also known as derive access barring factor from system information broadcast), classify the reason for access, select an access barring scaling factor (i.e. a barring scaling information) based on per User Equipment defined rules to be applied, apply the rules in order to determine if access to a shared medium is possible, access the shared medium if applicable or determine when a new attempt to access the shared medium is applicable (i.e. after which access barring time another access request can be sent).

The UE specific access barring scaling factor is defined by the network by means of dedicated signalling the access barring scaling factor towards a single UE or by defining the access barring scaling factor for a group of terminals determined by group specific signalling either with a group specific dedicated signalling or by broadcast control signalling means.

As a further preferable embodiment of the present invention it is proposed to define not just a per User Equipment access barring scaling factor per device, but to define a group of access barring scaling factors for a particular User Equipment. In this case the group of access barring scaling factors is either applied on a per UE activated Quality-of-Service level (also known as per Quality-of-Service bearer/per Radio bearer) or on a per application level (e.g. determined by an "IP source/destination/port triplet") or—especially beneficial for M2M (machine to machine) communication devices—on a per "M2M service class" basis. "M2M service class" basis in this sense is meant to be a function which is defined for an M2M terminal device, where a plurality of M2M services are running, each belonging to a particular "M2M service class". I.e. the plurality of non-realtime status updates, near-realtime alarm event notification or realtime-services with high bitrates.

According to a further embodiment of the present invention, a further barring factor information is transmitted to the User Equipment on the control channel within the network cell, and independently thereof a further barring scaling information is transmitted to the User Equipment on a control channel, especially a dedicated control channel, wherein the public land mobile network (PLMN) provides a further service, wherein by means of a combined use of the further barring factor information and of the further barring scaling information, an access control to the further service is realized with regard to the User Equipment by deciding whether a specific access request of the User Equipment to the further service is accepted or rejected.

Thereby, it is advantageously possible to control the access to the public land mobile network (PLMN) in a still finer manner, i.e. not only different User Equipments (s) can (at least in principle) be individually controlled regarding the network access (on a "per User Equipment basis") but it is possible that different services (i.e. a service and a further service) of the public land mobile network (PLMN) used by the same User Equipment can be treated differently by the public land mobile network (PLMN). For example, it is possible that in a situation of high network usage, the access to voice functionality is restricted for a specific User Equipment while the access to data service functionality is not or not as substantially reduced with respect to that User Equipment. According to the embodiment discussed in this paragraph, a different (cell-global) barring factor information is used for different services (i.e. a barring factor information regarding the service and a further barring factor information regarding the further service).

According to a further embodiment of the present invention, a further barring scaling information is transmitted to the User Equipment on a control channel, especially a dedicated control channel independently from the transmission of the barring factor information to the User Equipment on the control channel, wherein the public land mobile network (PLMN) provides a further service, wherein by means of a combined use of the barring factor information and of the further barring scaling information, an access control to the further service is realized with regard to the User Equipment by deciding whether a specific access request of the User Equipment to the further service is accepted or rejected.

Thereby, it is advantageously also possible to control the access to the public land mobile network (PLMN) in a finer manner than only on a per User Equipment basis, i.e. not only different User Equipment(s) can (at least in principle) be individually controlled regarding the network access but it is possible that different services (i.e. a service and a further service) of the public land mobile network (PLMN) used by the same User Equipment can be treated differently by the public land mobile network (PLMN). For example, it is possible that in a situation of high network usage, the access to voice functionality is restricted for a specific User Equipment while the access to data service functionality is not or not as substantially reduced with respect to that User Equipment. According to the embodiment discussed in this paragraph, it is possible and preferred according to the present invention that the same (cell-global) barring factor information is used for different services (i.e. only the barring factor information is transmitted (cell-globally) and it is
either explicitly indicated by the public land mobile network, or
understood by the User Equipment
that the barring factor information refers to different services (i.e. the barring factor information acts as the barring factor information regarding the service and acts as the further barring factor information regarding the further service).

According to the standardization document 3GPP TS.36.331v9.2.0, the access control is performed using a barring factor information broadcast within the network cell to the User Equipments present. Preferably, the barring factor information has a value between (and including) 0 and 0.95. On attempting to request access to the public land mobile network (PLMN), the User Equipment draws a randomized number rand between 0 and 1, and only in case rand is inferior to the barring factor information, access is granted (i.e. in case rand is superior to the barring factor information access is denied). The present invention proposes to use the appropriate barring factor information (which is global within the considered network cell) and an appropriate barring scaling information (which is or at least can be individual per User Equipment or group of User Equipments). According to a preferred embodiment, the random number rand is multiplied with the barring scaling information and compared with the barring factor information. This means that a value of the barring scaling information lower than one will increase the probability of access granted to the public land mobile network (PLMN) whereas a value of the barring scaling information higher than one will decrease the probability of access granted to the public land mobile network (PLMN). Other embodiments of the use of the barring scaling information are possible according to the present invention. For example, the barring scaling information can be added to or subtracted from the barring factor information (and then the result of this operation compared with the random number rand: an increase of the resultant number (by adding or subtracting the barring factor information and the barring scaling information) will increase the probability of access granted to the public land mobile network (PLMN) and a decrease of the resultant number will decrease this probability. Alternatively, the barring scaling information can be added to the random number rand, thus decreasing the probability of access granted.

According to still another embodiment of the present invention, a further User Equipment receive the barring factor information on the control channel within the network cell and an individual barring scaling information on a control channel, especially a dedicated control channel, wherein the User Equipment and the further User Equipment belong to one group of User Equipments within the network cell of the public land mobile network (PLMN).

Thereby, it is advantageously possible according to the present invention that for groups of User Equipments the same or a different barring scaling information can be assigned by the public land mobile network (PLMN). For example, it is advantageously possible that a prioritized access to the PLMN is assigned to the group of User Equipments within a cell that are more interesting to the network operator (so called gold customers) compared to the group of User Equipments within a cell that are less interesting to the network operator. This can be reflected in prioritizing the access to the network permitted to the so-called gold customers in relation to the access permitted to other customers.

According to still a further preferred embodiment of the present invention, generic barring time information is transmitted to the User Equipment on a broadcast control channel, wherein a barring time scaling information is transmitted to the User Equipment on a control channel, especially a dedicated control channel, wherein after a specific access request of the User Equipment to the service and for a period of time either
  dependent on the barring time scaling information, or
  based on a combined use of the generic barring time information and the barring time scaling information,
the access to the service is specifically barred for the User Equipment. According to a further modification of this embodiment, a further barring time scaling information is transmitted to the User Equipment on the control channel, especially the dedicated control channel, wherein the public land mobile network (PLMN) provides a further service, wherein after a specific access request of the User Equipment to the further service and for a period of time either
  dependent on the further barring time scaling information, or
  based on a combined use of the generic barring time information and the further barring time scaling information,
the access to the further service is specifically barred for the User Equipment.

Thereby, it is advantageously possible to realize an access control regarding the barring time to the public land mobile network (PLMN) individually for different User Equipments (i.e. on a per User Equipment basis), and it is also possible to realize an access control regarding the barring time for different services (service and further service) within the User Equipment. According to one alternative variant of this embodiment, it is possible that the barring time scaling information (or the barring time scaling information and the further barring time scaling information) is an information indicating a period of time, e.g. a period of time expressed in for example seconds and wherein this barring time scaling information (as a more specific information for a specific User Equipment or for a specific service (or a further service) within or usable with a User Equipment) replaces the generic barring time (broadcast on a broadcast control channel to all User Equipments within the network cell). This variant of the embodiment is addressed by the wording "dependent on the barring time scaling information". Alternatively thereto it is also possible and preferred according to another variant of this embodiment of the present invention that the barring time scaling information (or the barring time scaling information and the further barring time scaling information) is used to determine the time interval a User Equipment is barred by means of a combined use of both the barring time scaling information and the generic barring time information (broadcast to all User Equipments within the network cell). This is, e.g., possible by using the barring time scaling information as a factor by which the generic barring time information is to be multiplied so that the barring time to be applied is either longer than specified by the generic barring time (in case that the barring time scaling information indicates a multiplication factor superior to 1) or shorter than specified by the generic barring time (in case that the barring time scaling information indicates a multiplication factor inferior to 1). Alternatively, it is also possible that the barring time scaling information indicates a period of time, e.g. a period of time expressed in seconds and wherein this barring time scaling information is either added to or subtracted from the generic barring time information. This variant of the embodiment is addressed by the wording "based on a combined use of the generic barring time information and the barring time scaling information (or the further barring time scaling information)".

According to still a further preferred embodiment of the present invention, a generic barring time information is transmitted to the User Equipment on a broadcast control channel and a specific barring time information on a control channel, especially a dedicated control channel,
  wherein after a specific access request of the User Equipment to the service, the access to the service is specifically barred for the User Equipment based on a combined use of the generic barring time information and the dedicated barring time information, or
  wherein after a specific access request of the User Equipment to the service and to the further service, the access to the service is specifically barred for the User Equipment based on a combined use of the generic barring time information and the dedicated barring time information, and the access to the further service is specifically barred for the User Equipment based on a combined use of the generic barring time information and the further barring time information.

Thereby, it is advantageously possible to realize a flexible access control to the public land mobile network (PLMN).

According to the present invention, the service and/or the further service are chosen of the set comprising a network service of a public land mobile network (PLMN), the access to a shared medium, a Quality-of-Service level, and/or a M2M-service-class. Furthermore, it is preferred according to the present invention that the service relates to a radio bearer identity and/or to a Quality-of-Service bearer identity and/or the further service relates to a further radio bearer identity and/or to a further Quality-of-Service bearer identity. One prominent example of a service or a shared medium according to the present invention is the access of the User Equipment to the Random Access Control Channel (RACH) of the public land mobile network (PLMN).

Thereby, it is advantageously possible provide a fine grained access control regarding different services or access modes of a specific User Equipment.

According to still a further preferred embodiment of the present invention, an active state barring information is transmitted to the User Equipment on a control channel, especially a dedicated control channel, wherein in case that the User Equipment is in an active or connected state and dependent on the active state barring information, an access control to the service is realized with regard to the User Equipment by deciding whether a specific access request of the User Equipment to the service is accepted or rejected. According to another preferred embodiment of the present invention, a further active state barring information is transmitted to the User Equipment on a control channel, especially a dedicated control channel, wherein the public land mobile network (PLMN) provides a further service, wherein in case that the User Equipment is in an active or connected state and dependent on the further active state barring information, an access control to the further service is realized with regard to the User Equipment by deciding whether a specific access request of the User Equipment to the further service is accepted or rejected.

By means of providing the active state barring information (or the active state barring information and the further active state barring information) to the User Equipment, it is advantageously possible according to the present invention to also control the access of User Equipment being in an active (or in a connected) state. This is important because due to the increase of mobile data application enabled User Equipments, the proportion of those User Equipments that are not in a strictly speaking idle mode (but in either an active mode or in an at least partly "connected" mode or in an at least semi-active mode, i.e. an operation mode where a packet data connection is activated or an Internet Protocol address active) is growing and thus it is important also to control the access to shared media or services of the public land mobile network (PLMN) with regard to such non-idle mode User Equipments. According to the present invention, this functionality is provided by means of the active state barring information, e.g. a flag information on a per User Equipment basis, for controlling the access of the User Equipment to (all the services of) the public land mobile network (PLMN), or by means of the active state barring information and the further active state barring information, e.g. a flag information on a per Quality-of-Service bearer basis, for controlling the access of the User Equipment to the public land mobile network (PLMN) for different services individually.

According to the present invention, it is also possible and preferred that a (first) barring scaling information (or a (first) barring scaling information and a further (second) barring scaling information) is transmitted to the User Equipment and used for controlling the access of the User Equipment to the public land mobile network (PLMN) for the case that the User Equipment is in the idle state (i.e. for the transition of the User Equipment from the idle state to the (fully) active state) and that a (third) barring scaling information (or a (third) barring scaling information and a further (fourth) barring scaling information) is transmitted to the User Equipment and used for controlling the access of the User Equipment to the public land mobile network (PLMN) for the case that the User Equipment is in the active (or connected) state (i.e. for the transition of the User Equipment from the (partly) active (or connected) state to the (fully) active state).

Accordingly it is possible and preferred according to the present invention that cumulatively or alternatively to using different barring scaling information for the transition of the User Equipment from the idle mode to the (fully) active mode or for the transition of the User Equipment from the (partly) active (or only connected) state to the (fully) active state, also a different barring time scaling information is used. This means that a (first) barring time scaling information (or a (first) barring time scaling information and a further (second) barring time scaling information) is transmitted to the User Equipment and used for controlling the access of the User Equipment to the public land mobile network (PLMN) for the case that the User Equipment is in the idle state (i.e. for the transition of the User Equipment from the idle state to the (fully) active state) and that a (third) barring time scaling information (or a (third) barring time scaling information and a further (fourth) barring time scaling information) is transmitted to the User Equipment and used for controlling the access of the User Equipment to the public land mobile network (PLMN) for the case that the User Equipment is in the (partly) active (or connected) state (i.e. for the transition of the User Equipment from the (partly) active (or connected) state to the (fully) active state).

The present invention also relates to a public land mobile network (PLMN) comprising at least one network cell, wherein a control channel is broadcast within the network cell, wherein the public land mobile network (PLMN) provides a service, wherein the public land mobile network (PLMN) transmits a barring factor information on the broadcast control channel to a User Equipment within the network cell, and wherein independently thereof the public land mobile network (PLMN) transmits a barring scaling information to the User Equipment on a control channel, especially a dedicated control channel, wherein by means of a combined use of the barring factor information and of the barring scaling information, an access control to the service is realized with regard to the User Equipment by deciding whether a specific access request of the User Equipment to the service is accepted or rejected.

The present invention further relates to a program comprising a computer readable program code for controlling an entity of a public land mobile network (PLMN) according to an inventive method.

The present invention further also relates to a computer program product comprising an inventive program.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

According to the present invention, an improved method to control the access of User Equipments to a public land mobile network (PLMN) is disclosed. FIG. 4 schematically shows an example of a public land mobile network (PLMN) comprising a core network CN and a network cell 5. It is evident to a person skilled in the art that usually, the public land mobile network (PLMN) comprises a plurality of network cells comparable to the network cell depicted in FIG. 4. The network cell 5 comprises a, for example, an eNodeB eNB or at least an eNodeB is assigned to the network cell 5 (which means that one eNodeB can also serve a plurality of network cells 5). Usually, a plurality of User Equipments are present within the geographical extension of the network cell 5. For the purpose of describing the present invention, the network cell 5 comprises a (first) User Equipment, a further (or second) User Equipment UE2 and another (or third) User Equipment UE3. In the following, the realization of enhanced access control, e.g. of a M2M device/or another User Equipment terminal with an improved possibility for granting access to a shared medium of the public land mobile network (PLMN) as proposed by the present invention is exemplarily explained for a cellular system operating according to the E-UTRAN (LTE) standard, but is also applicable for any other cellular network using any other technology.

In order to allow a selective access control to a shared medium, i.e. for example the Random Access Channel (RACH) of LTE, it is proposed to use a per User Equipment access barring scaling factor (or barring scaling information) resulting in a differentiation between access probability between different devices, even if the general access barring factor is unique for all UEs.

An optimization of this embodiment allows a finer differentiation than a per User Equipment by defining a group of access barring scaling information, where the individual pieces of access barring scaling information are linked to either the activated Quality-of-Service bearers/radio bearer or—especially advantageously for M2M communication devices, but not limited to—linked to "M2M service class".

For the present invention the definition of the access barring scaling factors is either defined with dedicated signalling (303), where the terminal in question is assigned either a single access barring scaling factor applicable for any access to a cell, or a group of access barring scaling factors (304) individual for Quality-of-Service bearers or "M2M service class".

Figure 3:
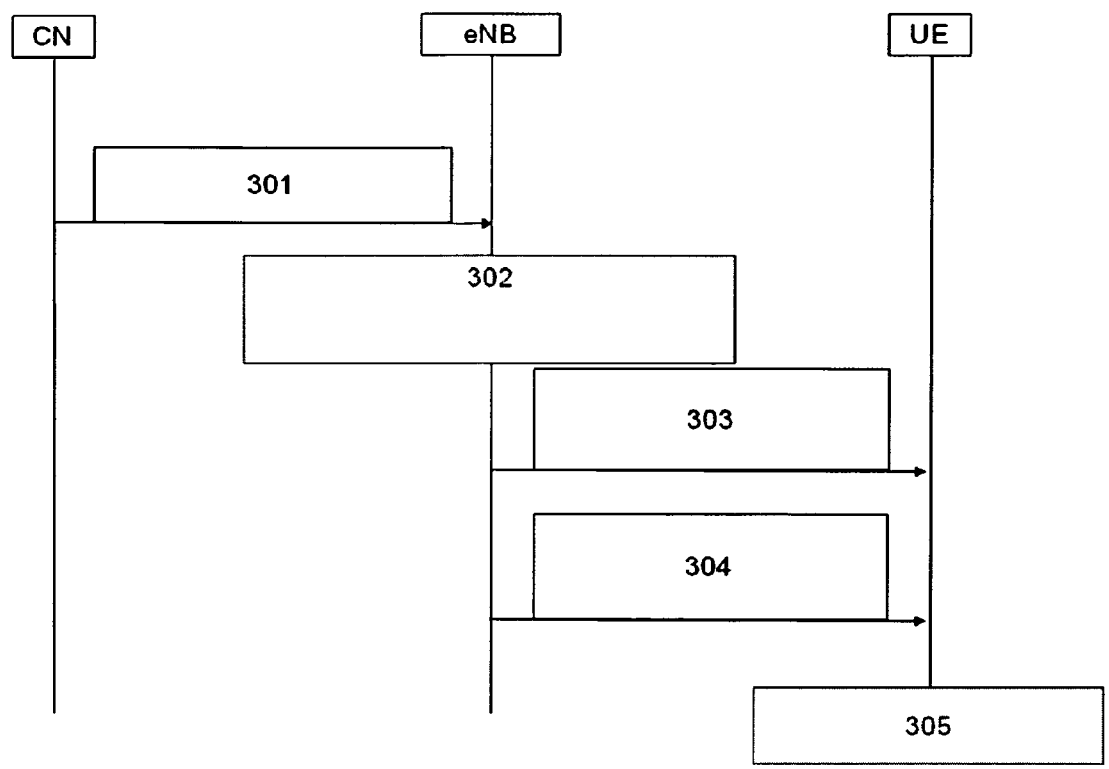
FIG. 3 illustrates schematically a per User Equipment access barring probability scaling.

A practical application of the inventive method is explained exemplarily for a per User Equipment access barring scaling information in the following and represented in FIG. 3. In FIG. 3, a schematical representation of the messages exchanged between a User Equipment UE, an eNodeB (or base station or base station transceiver), and a Core Network of a public land mobile network (PLMN) is shown regarding the controlling access to the network.

It is proposed with the method described here, that an individual or particular User Equipment UE is assigned with a barring scaling factor (derived from or triggered by, e.g. an indication message 301 from the Core Network to the eNodeB eNB, and a processing 302 at the eNodeB eNB, e.g. deriving the barring scaling factor) to be applied on the general access barring factor and signalled to the UE using either a message 303 using a dedicated control channel or a group message 304 using a broadcast control channel. In more detail, the indication message 301, e.g., comprises a content of the form "Radio Access Network Application Protocol (RANAP) INITIAL CONTEXT SETUP REQUEST ( . . . , subscriber profile ID)". Furthermore, the processing 302 at, e.g., the eNodeB eNB determines individual barring scaling information on a per User Equipment basis (or on a per group basis or on a per service basis), for example based on locally defined rules which scaling on access barring should be applied. The message 303 or the group message 304 are meant to be alternatives, i.e. the barring scaling information (and optionally the dedicated barring time) is transmitted either to an individual User Equipment (by means of using message 303 on a dedicated control channel) or to a group of User Equipments (by means of using group message 304 on the broadcast control channel). In a processing step 305 the User Equipment applies the barring scaling information (and optionally the dedicated barring time information) according to the inventive method. In case the group based signalling is to be used, the UEs need to be assigned to a specific group, based on dedicated signalling, similar to the flow with message 303.

According to the state of art as defined in [3GPP TS 36.331v9.2.0, chapter 5.3.3] the UE in case of initiating an RRC connection establishment procedure is requested to check the access class barring status from the system information broadcast type 2 (SIB2), check if the Information Elements (IEs) "ac-BarringInfo" and the Information Element "ac-BarringForMO-Data" is present. If this is the case,
  a random number 'rand' is drawn ('rand' is uniformly distributed in the range: 0≤rand<1);
  if 'rand' is lower than the value indicated by ac-BarringFactor included in ac-BarringForMO-Data, then
    consider access to the cell as not barred;
  else:
    consider access to the cell as barred;

As the network cell 5 (or the respective eNodeB entity) indicates the actual access barring factor in the range 0.0 to 0.95 [see 3GPP TS 36.331, chapter 6.1.3] and the UE has drawn a uniformly distributed random number "rand" in the range 0≤rand<1, it knows if the access to the cell for this attempt is allowed or not. This procedure is represented by means of a flow diagram in FIG. 1, where:
  the procedure starts at a step 31 asking whether mobile originated or mobile originating (MO) data are present (i.e. whether access to a service or a shared medium of the public land mobile network (PLMN) is necessary or not); in case such data are present, i.e. an access is required, the program flow branches to a step 32;
  in the step 32, it is asked whether a timer T302 or a timer T303 is still running or not; in the affirmative case, the flow branches to a step 50 corresponding to the denial of the requested access to the public land mobile network (PLMN); if none of the timer T302 or T303 are still running, the flow branches to a step 33;
  in the step 33, it is asked whether mobile originated data should be barred or not; in the affirmative case, the flow branches to a step 34; if mobile originated data should not be barred, the flow branches to a step 40 corresponding to granting the requested access to the public land mobile network (PLMN);
  in the step 34, it is asked whether the User Equipment is associated with access classes 11 to 15 or not; in the affirmative case, the flow branches to a step 35; if the User Equipment is not associated with access classes 11 to 15, the flow branches to a step 36 corresponding to drawing a random number 'rand';
  in the step 35, it is asked whether one of access classes 11 to 15 are set to zero or not; in the affirmative case, the flow branches to the step 40; if none of access classes 11 to 15 are set to zero, the flow branches to the step 36 corresponding to drawing the random number 'rand';
  in the step 36, the random number 'rand' is drawn, 'rand' being uniformly distributed in the range: 0≤rand<1; and the flow branches to a step 37;
  in the step 37, it is asked whether 'rand' is inferior to the access barring factor information applied generally to all User Equipments within the network cell 5; in the affirmative case, the flow branches to the step 40; if 'rand' is not inferior to the access barring factor information, the flow branches to a step 38 corresponding to starting timer T303 (corresponding to barring time information);
  in the step 38, the timer T303 is started and the flow branches to the step 50 corresponding to the denial of the requested access to the public land mobile network (PLMN).

Given this current state of the art, based on the access barring factor applying for all UEs in a given cell and the uniform distribution of the random draw, the probability for each UE to gain access to this cell is exactly the same.

Figure 2:
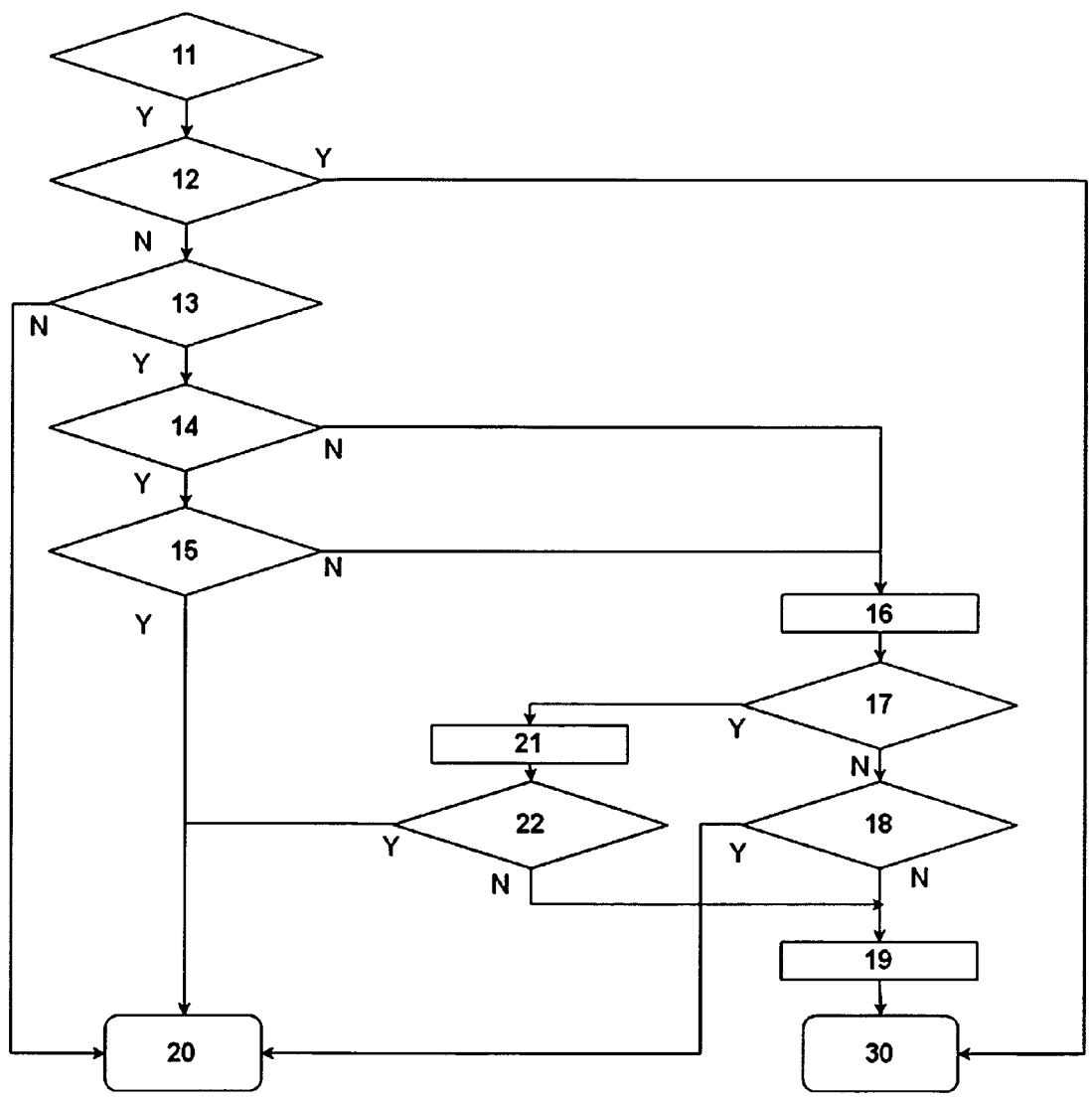
FIG. 2 illustrates schematically the flow diagram for access barring according to the present invention.

The proposed method according to the present invention comprises the use of an access barring scaling information (or an access barring scaling factor or a barring scaling information) is applied by the individual User Equipment after random draw. By doing so, it is possible to influence the random draw 'rand' based on a factor (or scaling item), i.e. the barring scaling information, defined by the network operator, in order to decrease or to increase the access probability individually per User Equipment. A flow diagram showing an embodiment of such an inventive method according to the present invention is schematically represented in FIG. 2, where:
  the procedure starts at a step 11 asking whether mobile originated or mobile originating (MO) data are present (i.e. whether access to a service or a shared medium of the public land mobile network (PLMN) is necessary or not); in case such data are present, i.e. an access is required, the program flow branches to a step 12;

in the step 12, it is asked whether a timer T302 or a timer T303 is still running or not; in the affirmative case, the flow branches to a step 30 corresponding to the denial of the requested access to the public land mobile network (PLMN); if none of the timer T302 or T303 are still running, the flow branches to a step 13;

in the step 13, it is asked whether mobile originated data should be barred or not; in the affirmative case, the flow branches to a step 14; if mobile originated data should not be barred, the flow branches to a step 20 corresponding to granting the requested access to the public land mobile network (PLMN);

in the step 14, it is asked whether the User Equipment is associated with access classes 11 to 15 or not; in the affirmative case, the flow branches to a step 15; if the User Equipment is not associated with access classes 11 to 15, the flow branches to a step 16 corresponding to drawing a random number 'rand';

in the step 15, it is asked whether one of access classes 11 to 15 are set to zero or not; in the affirmative case, the flow branches to the step 20; if none of access classes 11 to 15 are set to zero, the flow branches to the step 16 corresponding to drawing the random number 'rand';

in the step 16, the random number 'rand' is drawn, 'rand' being uniformly distributed in the range: 0≤rand<1; and the flow branches to a step 17;

in the step 17, it is asked whether a barring scaling information is present; in the affirmative case the flow branches to a step 21; otherwise, the flow branches to an step 18;

in the step 21, 'rand' is multiplied with the barring scaling information (or access barring scaling factor) and the flow branched to a step 22;

in the step 22, it is asked whether the scaled 'rand' number (i.e. the product of 'rand' with the barring scaling information) is inferior to the access barring factor information applied generally to all User Equipments within the network cell 5; in the affirmative case, the flow branches to the step 20; if the scaled 'rand' number is not inferior to the access barring factor information, the flow branches to a step 19 corresponding to starting timer T303 (corresponding to barring time information);

in the step 18, it is asked whether 'rand' is inferior to the access barring factor information applied generally to all User Equipments within the network cell 5; in the affirmative case, the flow branches to the step 20; if 'rand' is not inferior to the access barring factor information, the flow branches to the step 19 corresponding to starting timer T303 (corresponding to barring time information);

in the step 19, the timer T303 is started and the flow branches to the step 30 corresponding to the denial of the requested access to the public land mobile network (PLMN).

The usage of the access barring scaling factor (or barring scaling information) is exemplarily explained by the following example:

In case 50% of the access attempts towards a network cell 5 should be blocked, the access class barring factor information would be set to p50, i.e. to 0.5 or 50% (in the Information Element "ac-BarringFactor" as defined in [3GPP TS 36.331]). On initiation of a RRC (Radio Resource Control) connection establishment procedure, a User Equipment would draw a random number 'rand' in the range 0≤rand<1, and thus with a 50% probability would get access on the shared medium of the network cell, e.g. the RACH (Random Access Control Channel). As the same random draw is implemented in all User Equipments or terminals, the distribution of User Equipment which gains access to the ones which don't is 50:50. According to the present invention, the inventive method proposes to apply a User Equipment specific access barring scaling factor (or barring scaling information), e.g. on top of the random draw 'rand'. If the User Equipment is for example configured with a barring scaling information (or access barring scaling factor ABSF) of ABSF=0.5, this means that the probability of gaining access is doubled compared to the previous case (where no UE specific access barring scaling factor (or barring factor information) is used by the User Equipment). If the barring scaling information is 0.1, it means that the probability is 10 times higher (or at most 100%) than without a User Equipment specific access barring scaling factor. Likewise if the barring scaling information is 10, the individual probability to gain access to the network cell 5 is 10 times lower than without an individual access barring scaling factor.

Depending on the range of the access barring scaling factor it is possible to increase or decrease the probability of access for an individual User Equipment by different factors. The exemplarily used factors are just for illustration and in principle any factor can be used. For practical reasons only a discrete number of access barring scaling factors should typically be defined, such as for example 0; 0.1; 0.2; 0.5; 1.0; 2.0; 5.0; 10.0.

An enhancement of the embodiment of the invention provides in addition to the User Equipment specific barring scaling information an barring time scaling information. The IE ac-BarringTime as defined in [3GPP TS 36.331v9.2.0] provides a cell wide barring time in case a User Equipment has not been granted for access to the cell. Like the access barring factor (or barring factor information) the value of this timer (i.e. the ac-BarringTime) applies for all UE in the same cell without any possibility to distinguish between the User Equipments. Hence all User Equipments will wait for the next attempt equally long based on the setting of the value. Hence in order to selectively control the access barring time for individual User Equipments it is proposed by the present invention that an barring time scaling information can be defined by the network on a per User Equipment basis to allow an individual control of the barring time per User Equipment. Similar to the barring scaling information the barring time scaling information can be either defined per User Equipment, or per Quality-of-Service Bearer or per "M2M service class", i.e. in case of a (first) service and a further (second) service of the public land mobile network (PLMN) (or first and second Quality-of-Service Bearer or first and second M2M service class) the access control of the User Equipment can be controlled not only on a "per User Equipment basis" but in a more fine-grained manner, namely "per Quality-of-Service Bearer or "per M2M service class", by transmitting a barring time scaling information and a further barring time scaling information and by applying the barring time scaling information on the access control with regard to the (first) service and by applying the further barring time scaling information on the access control with regard to the further (second) service.

In FIG. 5, the effect of a barring time information is schematically shown. The barring time information 8 that can be individually set for a User Equipment (by means of using either the barring time scaling information or by means of the combined use of the generic barring time information and the barring time scaling information) corresponds to the time that is necessary to elapse between a first access request 6 and a second access request 7 of the User Equipment.

Alternatively instead of using a per UE access barring time scaling factor which is based on the setting of the IE ac- BarringTime from SIB2 it might be advantageously possible to define the concrete barring time individually for a given UE. Likewise concrete barring times can be configured per QoS Bearer or per "M2M service class" (530).

For the radio network node configuring the enhanced access barring (i.e. the eNB in case of E-UTRAN) local configurations might be used where the identification which local configuration should be applied might be based on UE specific signalling from the CN (see FIG. 3). A standardized solution is based on the Subscriber Profile ID (SPID) concept of 3GPP as defined in [3GPP TS 23.401 and 3GPP TS 36.413]. This concept is also described in [EP 2119273].

Further an improved embodiment of the previously described method for UE specific access barring control includes control information, either per UE or individually for each QoS Bearer or per "M2M service class", if the access restrictions according to the access barring factor (and the optional scaling) are also valid for the case the UE is in connected mode rather than idle mode.

Finally as another improved embodiment of the previously described method for User Equipment specific access barring control includes control information signalled to the User Equipment by any of the procedures described to control individually on a per cell, per group of User Equipment, per User Equipment or per Quality-of-Service Bearer or per "M2M service class", if the access barring and the optionally provided barring scaling information and/or the barring time scaling information also applies while the UE being in a connected or active state rather then in an idle state.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for controlling the access of a User Equipment (UE) to a public land mobile network (PLMN), wherein the PLMN provides at least a service, the PLMN comprising at least one network cell, wherein a control channel is broadcast within the network cell, the method comprising the steps of:
   transmitting a barring factor information to the UE on the broadcast control channel within the network cell;
   transmitting a barring scaling information to the UE on a control channel independently of the barring factor information; and
   realizing, based on a combination of the barring factor information and the barring scaling information, an access control to the service with regard to the UE by deciding whether a specific access request of the UE to the service is accepted or rejected;
   wherein the barring scaling information is individually assigned to the UE on a per-UE basis and wherein the barring scaling information is defined by the PLMN for selectively controlling access of each UE to the PLMN;
   wherein the method further comprises:
   transmitting a generic barring time information the UE on a broadcast control channel; and
   transmitting a barring time scaling information to the UE on a control channel;
   wherein after a specific access request of the UE to the service and for a period of time based on the barring time scaling information or a combination of the generic barring time information and the barring time scaling information, the access to the service is specifically barred for the UE;
   wherein the PLMN provides a further service, and the method further comprises:
   transmitting a further barring time scaling information to the UE on the control channel;
   wherein after a specific access request of the UE to the further service and for a period of time based on the further barring time scaling information or a combination of the generic barring time information and the further barring time scaling information the access to the further service is specifically barred for the UE.

2. The method according to claim 1, wherein the PLMN provides a further service, and the method further comprises:
   transmitting a further barring factor information to the UE on the broadcast control channel within the network cell;
   transmitting a further barring scaling information to the UE on a control channel independent of the further barring factor information; and
   realizing, based on a combination of the further barring factor information and the further barring scaling information, an access control to the further service with regard to the UE by deciding whether a specific access request of the UE to the further service is accepted or rejected.

3. The method according to claim 1, wherein the PLMN provides a further service, and the method further comprises:
   transmitting a further barring scaling information to the UE on a control channel independent of the further barring factor information; and
   realizing, based on a combination of the barring factor information and the further barring scaling information, an access control to the further service with regard to the UE by deciding whether a specific access request of the UE to the further service is accepted or rejected.

4. The method according to claim 1, wherein a further UE receive the barring factor information on the broadcast control channel within the network cell and an individual barring scaling information on a control channel, wherein the UE and the further UE belong to one group of UEs within the network cell of the PLMN.

5. The method according to claim 1, wherein the service is from the group consisting of: a network service of a PLMN, the access to a shared medium, a Quality-of-Service level, and a machine-to-machine (M2M)-service-class.

6. The method according to claim 1, wherein the service relates to at least one of a radio bearer identity, a Quality-of-Service bearer identity.

7. The method according to claim 1, further comprising:
   transmitting an active state barring information to the UE on a control channel;
   wherein realization of the access control to the service is further based on the UE being in an active or connected state and based on the active state barring information.

8. The method according to claim 7, wherein the PLMN provides a further service, and the method further comprises:
transmitting a further active state barring information UE on a control channel; and
realizing an access control to the further service based on the UE being in an active or connected state and based on the further active state barring information by deciding whether a specific access request of the UE to the further service is accepted or rejected.

9. A public land mobile network (PLMN), comprising:
at least one network cell, wherein a control channel is broadcast within the network cell;
wherein the PLMN is configured to provide a service, transmit a barring factor information on the control channel to a User Equipment (UE) within the network cell, to transmit, independently from the transmission of the barring factor information, a barring scaling information to the UE on a control channel; and
wherein an access control to the service is realized with regard to the UE, based on a combination of the barring factor information and the barring scaling information, by deciding whether a specific access request of the UE to the service is accepted or rejected;
wherein the PLMN is further configured to transmit a generic barring time information to the UE on a broadcast control channel and to transmit a barring time scaling information to the UE on a control channel;
wherein after a specific access request of the UE to the service and for a period of time based on the barring time scaling information or a combination of the generic barring time information and the barring time scaling information, the access to the service is specifically barred for the UE;
wherein the PLMN is configured to provide a further service, and to transmit a further barring time scaling information to the UE on the control channel;
wherein after a specific access request of the UE to the further service and for a period of time based on the further barring time scaling information or a combination of the generic barring time information and the further barring time scaling information, the access to the further service is specifically barred for the UE.

10. The PLMN according to claim 9, wherein the barring scaling information is individually assigned to the UE on a per-UE basis and wherein the barring scaling information is defined by the PLMN for selectively controlling access of each UE to the PLMN.

11. A non-transitory computer-readable medium having computer-executable instructions stored thereon for controlling the access of a User Equipment (UE) to a public land mobile network (PLMN), wherein the PLMN provides at least a service, the PLMN comprising at least one network cell, wherein a control channel is broadcast within the network cell, the computer-executable instructions, when executed, causing the following steps to be performed:
transmitting a barring factor information to the UE on the broadcast control channel within the network cell;
transmitting a barring scaling information to the UE on a control channel independently of the barring factor information; and
realizing, based on a combination of the barring factor information and the barring scaling information, an access control to the service with regard to the UE by deciding whether a specific access request of the UE to the service is accepted or rejected;
wherein the computer-executable instructions, when executed, further cause the following steps to be performed:
transmitting a generic barring time information to the UE on a broadcast control channel; and
transmitting a barring time scaling information to the UE on a control channel;
wherein after a specific access request of the UE to the service and for a period of time based on the barring time scaling information or a combination of the generic barring time information and the barring time scaling information, the access to the service is specifically barred for the UE;
wherein the PLMN provides a further service, and wherein the computer-executable instructions, when executed, further cause the following steps to be performed:
transmitting a further barring time scaling information to the UE on the control channel;
wherein after a specific access request of the UE to the further service and for a period of time based on the further barring time scaling information or a combination of the generic barring time information and the further barring time scaling information, the access to the further service s specifically barred for the UE.

12. The non-transitory computer-readable medium according to claim 11, wherein the barring scaling information is individually assigned to the UE on a per-UE basis and wherein the barring scaling information is defined by the PLMN for selectively controlling access of each UE to the PLMN.

13. A method for controlling the access of a User Equipment (UE) to a public land mobile network (PLMN), wherein the PLMN provides at least a service, the PLMN comprising at least one network cell, wherein a control channel is broadcast within the network cell, the method comprising the steps of:
transmitting a barring factor information to the UE on the broadcast control channel within the network cell;
transmitting a barring scaling information to the UE on a control channel independently of the barring factor information; and
realizing, based on a combination of the barring factor information and the barring scaling information, an access control to the service with regard to the UE by deciding whether a specific access request of the UE to the service is accepted or rejected;
wherein the method further comprises:
transmitting a generic barring time information to the UE on a broadcast control channel; and
transmitting a barring time scaling information to the UE on a control channel;
wherein after a specific access request of the UE to the service and for a period of time based on the barring time scaling information or a combination of the generic barring time information and the barring time scaling information, the access to the service is specifically barred for the UE;
wherein the PLMN provides a further service, and the method further comprises:
transmitting a further barring time scaling information to the UE on the control channel;
wherein after a specific access request of the UE to the further service and for a period of time based on the further barring time scaling information or a combination of the generic barring time information and the further barring time scaling information, the access to the further service is specifically barred for the UE.

14. The method according to claim 13, wherein the PLMN provides a further service, and the method further comprises:
transmitting a further barring factor information to the UE on the broadcast control channel within the network cell;
transmitting a further barring scaling information to the UE on a control channel independent of the further barring factor information; and
realizing, based on a combination of the further barring factor information and the further barring scaling information, an access control to the further service with regard to the UE by deciding whether a specific access request of the UE to the further service is accepted or rejected.

15. The method according to claim 13, wherein the PLMN provides a further service, and the method further comprises:
transmitting a further barring scaling information to the UE on a control channel independent of the further barring factor information; and
realizing, based on a combination of the barring factor information and the further barring scaling information, an access control to the further service with regard to the UE by deciding whether a specific access request of the UE to the further service is accepted or rejected.

16. The method according to claim 13, wherein a further UE receive the barring factor information on the broadcast control channel within the network cell and an individual barring scaling information on a control channel, wherein the UE and the further UE belong to one group of UEs within the network cell of the PLMN.

17. The method according to claim 13, wherein the service is from the group consisting of: a network service of a PLMN, the access to a shared medium, a Quality-of-Service level, and a machine-to-machine (M2M)-service-class.

18. The method according to claim 13, wherein the service relates to at least one of a radio bearer identity, a Quality-of-Service bearer identity.

19. The method according to claim 13, further comprising:
transmitting an active state barring information UE on a control channel;
wherein realization of the access control to the service is further based on the UE being in an active or connected state and based on the active state barring information.

20. The method according to claim 19, wherein the PLMN provides a further service, and the method further comprises:
transmitting a further active state barring information UE on a control channel; and
realizing an access control to the further service based on the UE being in an active or connected state and based on the further active state barring information by deciding whether a specific access request of the UE to the further service is accepted or rejected.

* * * * *